United States Patent
Biza et al.

(10) Patent No.: US 11,155,474 B2
(45) Date of Patent: Oct. 26, 2021

(54) COMPOSITIONS AND METHODS FOR TREATING WATER

(71) Applicant: Imerys USA, Inc., Roswell, GA (US)

(72) Inventors: Peter Biza, Tournefeuille (FR); Philip Jones, Woodstock, GA (US); David Cummings, Warthen, GA (US); Anthony Lyons, Macon, GA (US); Christopher Boothby, Cumming, GA (US); Marc De Sailly, Roswell, GA (US)

(73) Assignee: Imerys USA, Inc., Roswell, GA (US)

( * ) Notice: Subject to any disclaimer, the term of this patent is extended or adjusted under 35 U.S.C. 154(b) by 218 days.

(21) Appl. No.: 16/494,884

(22) PCT Filed: Mar. 16, 2018

(86) PCT No.: PCT/US2018/022772
§ 371 (c)(1),
(2) Date: Sep. 17, 2019

(87) PCT Pub. No.: WO2018/170344
PCT Pub. Date: Sep. 20, 2018

(65) Prior Publication Data
US 2020/0189934 A1 Jun. 18, 2020

Related U.S. Application Data

(60) Provisional application No. 62/473,060, filed on Mar. 17, 2017.

(51) Int. Cl.
*C02F 1/28* (2006.01)
*B01J 20/12* (2006.01)
(Continued)

(52) U.S. Cl.
CPC .............. *C02F 1/281* (2013.01); *B01J 20/12* (2013.01); *B01J 20/28016* (2013.01); *B01J 20/28059* (2013.01); *C02F 2103/007* (2013.01)

(58) Field of Classification Search
None
See application file for complete search history.

(56) References Cited

U.S. PATENT DOCUMENTS

| | | |
|---|---|---|
| 6,312,511 B1 | 11/2001 | Bilimoria et al. |
| 2004/0033266 A1* | 2/2004 | Thassu ............ B07B 1/42 424/489 |

(Continued)

FOREIGN PATENT DOCUMENTS

| | | | |
|---|---|---|---|
| WO | WO 2016/115078 A1 | 7/2016 | |
| WO | WO-2016115078 A1 * | 7/2016 | ............ C02F 1/281 |

OTHER PUBLICATIONS

International Search Report and Written Opinion dated May 25, 2018, in International Application No. PCT/US2018/022772 (9 pgs.).

*Primary Examiner* — Chester T Barry
(74) *Attorney, Agent, or Firm* — Finnegan, Henderson, Farabow, Garrett & Dunner, LLP

(57) ABSTRACT

Methods of treating water to promote the health of aquatic organisms are described. The method may include introducing pulverized kaolin into the water. The pulverized kaolin may have a particle size distribution such that at least 30% by weight of the particles pass through a 60 mesh screen. For example, the pulverized kaolin may be in the form of a dry powder having a $d_{50}$ diameter less than 300 µm. The pulverized kaolin may remain dispersed or suspended in the water without dispersants and/or surfactants, e.g., to reduce the amount of at least one pathogenic microorganism present (Continued)

in the water and/or to reduce or prevent exposure of aquatic organisms to the pathogenic microorganism(s).

20 Claims, 5 Drawing Sheets

(51) Int. Cl.
*B01J 20/28* (2006.01)
*C02F 103/00* (2006.01)

(56) References Cited

U.S. PATENT DOCUMENTS

2004/0149234 A1 8/2004 Mathur et al.
2014/0306038 A1 10/2014 Kragten et al.

\* cited by examiner

COMPOSITIONS AND METHODS FOR TREATING WATER

CLAIM FOR PRIORITY

This, application is a U.S. national phase entry under 35 U.S.C. § 371 from PCI International Application No. PCT/US2018/022772, filed Mar. 16, 2018. which claims the benefit of priority of U.S. Provisional Patent Application No. 62/473,060, filed Mar. 17, 2017, to both of which this application the benefit of priority and the subject matter of both of which is incorporated herein by reference in its entirety.

TECHNICAL FIELD

The present disclosure relates to compositions and methods for treating water in fish farms and other aquatic environments. More particularly, the disclosure relates to the use of fine particulate clays, such as pulverized clays, to promote aquatic health.

BACKGROUND

Certain waterborne pathogens in aquatic environments can threaten the health of aquatic organisms such as fish, shellfish, and crustaceans. Such pathogens include microorganisms such as bacteria and protozoans. For example, columnaris disease is caused by the rod-shaped Gram-negative bacterium *Flavobacterium columnare*, an opportunistic pathogen which causes substantial mortality globally in freshwater farmed fish species. Economically valuable channel catfish have been found to be very susceptible to this pathogen. Another example of a waterborne pathogen is *Saprolegnia*, a protozoan that frequently targets fish and causes necrosis of the skin.

Despite the importance and impact of disease caused by these pathogens, there are few readily available means for treatment or prevention. Antibiotics have been shown to exhibit some efficacy against columnaris disease, but the use of antibiotics in aquaculture is under increasing scrutiny and is becoming disfavored. Moreover, overuse of antibiotics in aquaculture in recent years has increased the risk of drug resistance acquisition by aquaculture pathogens such as *Flavobacterium columnare*.

Accordingly, there is a need for alternative preventatives and curatives for diseases caused by pathogens affecting aquaculture, including treatments that are not based on antibiotics.

SUMMARY

The present disclosure includes compositions and methods of use thereof to promote the health of aquatic organisms. For example, the methods herein may reduce and/or prevent exposure to pathogenic microorganisms/organisms such as bacteria, protozoa, viruses, fungi, algae, and/or parasites. Additionally or alternatively, the methods herein may promote aquatic health by increasing the turbidity of the water, e.g., to help increase the survival rate of juvenile fish.

According to some aspects of the present disclosure, for example, there is a method of treating water to reduce and/or prevent bacterial infection in an aquatic organism. The method may include introducing kaolin, e.g., particulate kaolin clay, to the water such that the kaolin reduces the presence of at least one undesirable microorganism/organism (e.g., pathogenic microorganism such as bacterial species and/or protozoa) present in the water, wherein the kaolin is pulverized. The method may include contacting an aquatic organism with the treated water. In some examples, the method may include contacting a microorganism, e.g., pathogenic microorganisms such as bacteria and/or protozoa, with the treated water. For example, the microorganism(s) may adsorb onto a surface of the kaolin.

The kaolin can have a BET surface area of at least 20 $m^2/g$ or at least 25 $m^2/g$, such as, e.g., at least 30 $m^2/g$, or at least 40 $m^2/g$. In some examples, the kaolin may have a BET surface area ranging from about 20 $m^2/g$ to about 40 $m^2/g$, from about 25 $m^2/g$ to about 35 $m^2/g$, or from about 35 $m^2/g$ to about 40 $m^2/g$.

The kaolin may comprise fine particulate kaolin clay. For example, the kaolin may be pulverized. According to some aspects of the present disclosure, the kaolin may comprise a particulate kaolin clay having a particle size distribution such that at least 70% by weight of the particles of kaolin have an equivalent spherical diameter (ESD) of less than 2 μm as measured by Sedigraph. For example, the kaolin may have a particle size distribution such that at least 80%, at least 85%, or at least 90% by weight of the particles of kaolin have an ESD of less than 2 μm as measured by Sedigraph.

In yet another aspect, the kaolin may have a particle size distribution such that at least 25% by weight of the particles of kaolin have an ESD of less than 0.25 μm as measured by Sedigraph. For example, the kaolin has a particle size distribution such that at least 30%, at least 40%, or at least 50% by weight of the particles of kaolin have an ESD of less than 0.25 μm as measured by Sedigraph.

In another aspect, the kaolin may have a combination of shape factor and particle size such that the product of its shape factor multiplied by the percentage by weight of the particles of kaolin clay having an ESD of less than 0.25 μm as measured by Sedigraph has a value of at least about 300. For example, the product of the shape factor of the kaolin clay multiplied by the percentage by weight of the particles of kaolin clay having an ESD of less than 0.25 μm as measured by Sedigraph may have a value of at least about 500, or at least about 1000.

In another aspect, the kaolin may have a combination of specific surface area and particle size such that the product of its specific surface area multiplied by the percentage by weight of the particles of kaolin clay having an ESD of less than 0.25 μm as measured by Sedigraph has a value of at least about 600. For example, the product of the specific surface area of the kaolin clay multiplied by the percentage by weight of the particles of kaolin clay having an ESD of less than 0.25 μm as measured by Sedigraph may have a value of at least about 800, or at least about 1000.

In another aspect, the particulate kaolin clay may be administered or introduced to the water to be treated to establish a concentration ranging from about 0.01 g/L to about 8.0 g/L, such as from about 0.1 g/L to about 7.0 g/L, from about 0.5 g/L to about 6.0 g/L, from about 1.0 g/L to about 5.0 g/L, from about 2.0 g/L to about 4.0 g g/L, or from about 0.5 g/L to about 3.0 g/L. In some examples, the kaolin include less than 0.1% by weight dispersant or surfactant, such as less than 0.05% by weight, or less than about 0.01% dispersant or surfactant. In some examples, the particulate kaolin does not comprise any dispersant or surfactant.

The compositions and methods herein may be used to treat water to reduce exposure of aquatic organisms to one or more pathogenic microorganisms or pathogenic organisms. For example, the pathogenic microorganism(s) may comprise at least one undesirable bacterial species chosen from *Flavobacterium columnare, Edwardsiella Ictaluri*, and *Edwardsiella tarda*. In another example, the pathogenic microorganism(s) may comprise a protozoan such as *Saprolegnia*. In yet another example, the pathogenic microorganism(s) or pathogenic organism(s) may comprise algae.

The aquatic organisms may comprise at least one fish, shellfish, or crustacean. The fish may comprise, for example, one or more fish selected from catfish, tilapia, carps, barbels and other cyprinids, salmon, sea bass, eels, mullet, bream, amberjack, grouper, perch, trout, sturgeon, or turbot, among others. In some examples, the aquatic organism comprises at least one crustacean, such as, for example, a crustacean selected from shrimp, prawns, lobster, crabs, or crayfish. Additionally or alternatively, the aquatic organisms may comprise at least one shellfish, such as, for example, an oyster, a scallop, a mussel, or a clam.

According to some aspects of the present disclosure, the method of treating water may include introducing pulverized kaolin into the water, wherein the pulverized kaolin may have a particle size distribution such that at least 30% by weight of the particles pass through a 60 mesh screen, and wherein the pulverized kaolin reduces the amount of at least one pathogenic microorganism present in the water. In some examples, the pulverized kaolin may have a particle size distribution such that from about 85% to about 93% by weight of the kaolin particles are retained on a 200 mesh screen, and from about 90% to 100% by weight of the particles are retained on a 325 mesh screen. The pulverized kaolin may be in the form of a dry powder, e.g., having a $d_{50}$ diameter less than 300 µm, such as less than 200 µm, or less than 100 µm. For example, the $d_{50}$ diameter of the dry powder pulverized kaolin may range from about 50 µm to about 350 µm.

The pulverized kaolin may remain suspended in the water for at least 2 hours, e.g., at least 4 hours, or at least 6 hours, after introducing the pulverized kaolin into the water. In at least one example, the pulverized kaolin disperses in the water to a concentration ranging from about 0.01 g/L to about 8.0 g/L, e.g., from about 1 g/L to about 5.0 g/L. In at least one example, the dry pulverized kaolin does not comprise a dispersant, surfactant, or other chemical additive.

According to some aspects of the present disclosure, the water may be contained in a portable tank. For example, the portable tank may contain a volume of water ranging from about 1,000 gallons to about 5,000 gallons, or from about 2,000 gallons to about 4,000 gallons. The water of the portable tank may contain at least one fish, e.g., a fish chosen from one or more of catfish, tilapia, carp, salmon, sea bass, eels, mullet, bream, amberjack, grouper, perch, trout, sturgeon, turbot, goldfish, koi, beta, or guppies.

The pulverized kaolin may be added to the portable tank once or multiple times, e.g., twice or three times per day, every other day, once a week, or once every two weeks. In at least one example, the pulverized kaolin is added to the water at least 3 hours, at least 6 hours, or at least 12 hours before transporting the portable tank from a first location to a second location, such as from a first pond to a second pond, from a pond to a vehicle (e.g., a truck used to transport the tank), or from a vehicle to a pond.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate various exemplary aspects of the disclosure, and together with the description, serve to explain the principles of the present disclosure.

DETAILED DESCRIPTION

Figure 1:
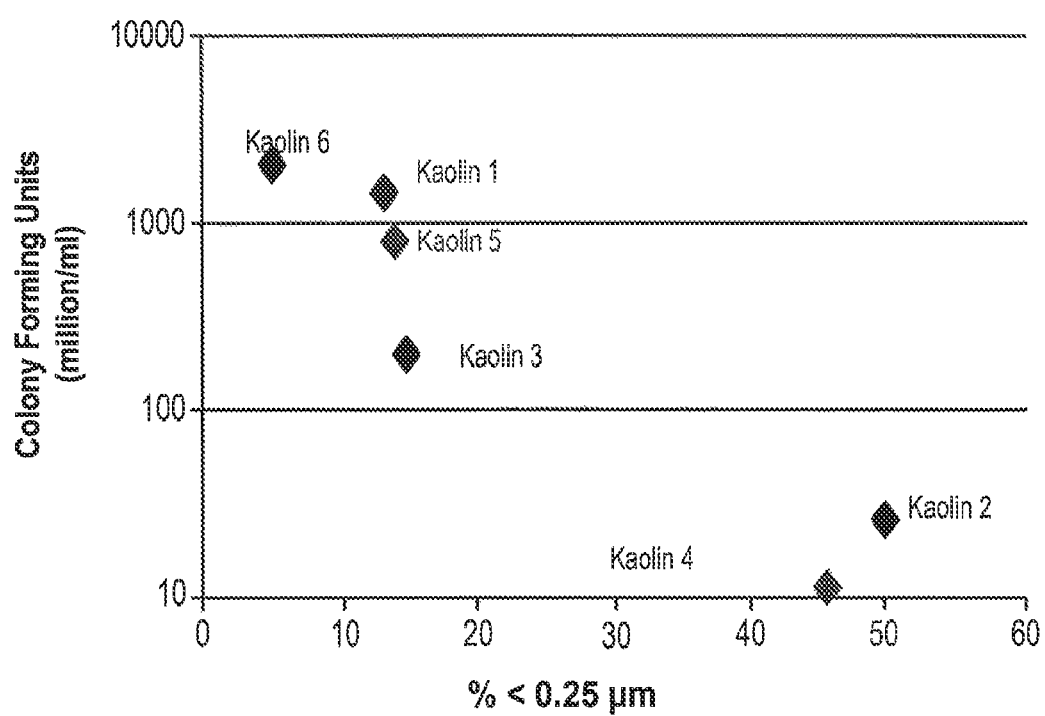
FIG. 1 is a graph representing the relative observed *F. columnare* colony counts obtained after treating with each of the kaolins assessed in the Examples, compared with the content of fine kaolin particles having a particle size less than 0.25 µm as measured by Sedigraph.

Particular aspects of the present disclosure are described in greater detail below. The terms and definitions provided herein control, if in conflict with terms and/or definitions incorporated by reference.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an," and "the" include plural reference unless the context dictates otherwise. The terms "approximately" and "about" refer to being nearly the same as a referenced number or value. As used herein, the terms "approximately" and "about" should be understood to encompass ±5% of a specified amount or value.

According to some aspects of the present disclosure, water may be treated with kaolin, e.g., a fine particulate kaolin clay, to promote aquatic health, such as the health of fish, crustaceans, and/or shellfish, as well as other aquatic organisms. For example, the methods herein may help to reduce and/or prevent exposure of aquatic organisms to pathogenic microorganisms such as bacteria, protozoa, viruses, fungi, and/or parasites. Further, for example, the methods herein may help to maintain or increase fish stocks, e.g., by improving the survival rate of juvenile fish. The methods herein may be used to treat still water (e.g., tanks, vats, aquariums, pools, ponds, lakes, wetlands, etc.) and/or moving water (e.g., brooks, streams, creeks, etc.). The water may comprise fresh water, or in some cases, salt water. The water may be contained in a stationary container or enclosure, such as a pond or pool, or in a transportable container or enclosure, such as a tank or vat. For example, containers or enclosures that contain from about 500 gallons (~2000 liters) to about 5,000 gallons (~19,000 liters) may be used in the methods herein, such as from about 1,000 gallons (~3,800 liters) to about 4,000 gallons (~15,100 liters), or from about 2,000 gallons (~7,500 liters) to about 3,000 gallons (~11,400 liters). It should be understood that containers/enclosures contained smaller and larger volumes of water also may be treated according to methods herein.

In some examples, the method comprises introducing kaolin into the water in a dosage sufficient to reduce the presence of at least one undesirable microorganism (pathogenic microorganism such as bacterial species and/or protozoa) present in the water. The method may further include contacting an aquatic organism with the treated water. In some examples, the method may include contacting a microorganism, e.g., pathogenic microorganisms such as bacteria and/or protozoa, with the treated water.

Kaolin predominantly contains the mineral kaolinite (a hydrous aluminosilicate having the general formula $Al_2Si_2O_5(OH)_4$), together with lesser amounts of various other minerals such as smectites, mica, and iron compounds. Exemplary smectite clays include, e.g., montmorillonite $((Na,Ca)_{0.33}(Al,Mg)_2(Si_4O_{10})(OH)_2 \cdot nH_2O)$, nontronite, beidellite, and saponite. In some aspects of the present disclosure, the kaolin may comprise at least 50% by weight kaolinite, e.g., from 50% by weight to about 90% by weight kaolinite, or from about 65% to about 75% by weight kaolinite.

The compositions herein may comprise kaolin formulated to facilitate dispersion and/or increase dispersal in the body of water to be treated. For example, the kaolin may comprise pulverized kaolin, e.g., fine particulate kaolin. The pulverized kaolin may provide for sufficient dispersion without the need to add surfactants or other dispersants, or for any chemical treatment of kaolin to increase dispersion. Thus, the methods herein may provide for compositions with good dispersion characteristics at lower cost than clays that incorporate dispersants. Further, the pulverized kaolin may avoid introduction of dispersants or other chemical additives that could endanger the health of aquatic organisms.

The particle size distribution of the pulverized kaolin may be determined by sieve analysis, e.g., with a Rotap sieve shaker. In this procedure, several screens of different mesh size are stacked such that the screen openings are successively smaller from top to bottom. A particulate sample is placed on the top screen and the instrument taps or shakes the stack of screens for a defined period of time (e.g., 10 minutes). This tapping moves the sample around the first screen and the material that is smaller than the sieve size falls through the first screen to the next screen. This continues until the original sample has been separated into its various sieve size fractions. The results may be expressed as the percent that is retained on the various screens, or alternatively, as the percent that passes through each screen. For example, the pulverized kaolins may be analyzed in screens of mesh size 60 (250 µm), mesh size 100 (150 µm), mesh size 200 (75 µm), and/or mesh size 325 (45 µm).

In some aspects of the present disclosure, the kaolin may have a particle size distribution such that at least 20% by weight of the particles pass through a 60 mesh screen, such as at least 25% by weight, at least 30% by weight, at least 35% by weight, at least 40% by weight, at least 45% by weight, at least 50% by weight, or even at least 55% by weight. For example, from about 25% by weight to about 55% by weight, or from about 40% by weight to about 50% by weight of the particles may pass through a 60 mesh screen.

In some examples, the pulverized kaolin may have a particle size distribution such that from about 45% to about 65% by weight, such as from about 50% to about 60% by weight, or about 55% of the particles are retained on a 60 mesh screen; and/or from about 60% to about 80% by weight, such as from about 65% to about 75% by weight, e.g., about 70% by weight of the particles are retained on a 100 mesh screen; and/or from about 80% to about 95% by weight of the particles, such as from about 85% to about 93% by weight, e.g., about 90% by weight of the particles are retained on a 200 mesh screen, and/or from about 90% to 100% by weight, such as from about 95% to about 99% by weight, e.g., about 99% by weight of the particles are retained on a 325 mesh screen.

Another method for characterizing particle size uses a SEDIGRAPH® instrument (e.g., SEDIGRAPH 5100® obtained from Micromeritics Corporation, USA). In this procedure, the sedimentation speeds of dispersed particles of the sample are measured through a standard dilute aqueous suspension. The size of a given particle may be expressed in terms of the diameter of a sphere of equivalent diameter (i.e., the "equivalent spherical diameter" or ESD), which sediments through the suspension, which may be used to characterize the particulate material. The Sedigraph records the percentage by weight of particles having an ESD less than a particular ESD value, versus that ESD value.

In some examples, the pulverized kaolin may have a particle size distribution such that greater than 75% by weight of the particles, greater than 80% by weight of the particles, greater than 85% by weight of the particles, greater than 90%, or even greater than 95% by weight of the particles have an ESD of less than 2 µm as measured by Sedigraph. In some examples, in terms of fine particle content, the pulverized kaolin may have a particle size distribution wherein at least 20% by weight of the particles have an ESD less than 0.25 µm, e.g., at least 25% by weight, at least 30% by weight, at least 40% by weight, or at least 50% by weight of the particles have an ESD less than 0.25 µm as measured by Sedigraph. In some examples, from about 50% to 100% by weight, or from about 60% to about 90% by weight of the kaolin particles may have an ESD of less than 0.25 µm as measured by Sedigraph.

In some examples, the pulverized kaolin may have a particle size distribution such that at least 70% by weight of the particles of kaolin have an ESD of less than 2 µm as measured by Sedigraph, such as at least 80% by weight, at least 85% by weight, or at least 90% by weight have an ESD of less than 2 µm as measured by Sedigraph. Further, in some examples, the pulverized kaolin may have a particle size distribution such that at least 25% by weight of the particles of kaolin clay have an ESD of less than 0.25 µm as measured by Sedigraph, such as at least 30% by weight, at least 40% by weight, or at least 50% by weight have an ESD of less than 0.25 µm as measured by Sedigraph.

It should be noted that the Sedigraph method measures the size of individual particles in a liquid dispersion, whereas the Rotap method measures the coarse aggregates of dry particles, e.g., without use of a surfactant or other dispersant to separate particles. As such, the Rotap sieve measurement method generally provides particle size measurements indicative of the dry pulverized material.

The particle size distribution according to either the Rotap or Sedigraph measurement procedure may be expressed in terms of the percentage by weight of particles having a size less than a particular diameter. For example, $d_{50}$ is the diameter at which 50% by weight of the particles have a smaller size than the $d_{50}$ value. Similarly, $d_{30}$ is the particle diameter at which 30% by weight of the particles have a smaller size, and $d_{70}$ is the particle diameter at which 70% by weight of the particles have a smaller size. The term "coarse" generally refers to a particle size distribution wherein less than 30% by weight of the particles have a $d_{50}$ diameter below 0.25 µm, whereas "fine" generally refers to a particle size distribution wherein greater than 30% by weight of the particles have a $d_{50}$ diameter below 0.25 µm.

According to some aspects of the present disclosure, the dry pulverized kaolin as measured by Rotap may have a $d_{50}$ particle diameter less than 300 µm, such as less than 250 µm, less than 200 rpm, less than 150 µm, or less than µm. For example, the dry pulverized kaolin as measured by Rotap may have a $d_{50}$ diameter ranging from about 50 µm to about 300 µm, from about 100 µm to about 250 µm, or from about 150 µm to about 200 µm, e.g., a $d_{50}$ diameter of about 50 µm, about 100 µm, about 150 µm, about 200 µm, about 250 µm, or about 300 µm. It should be noted that the $d_{50}$ particle diameter measured by Sedigraph for the pulverized kaolin would be expected to be smaller (e.g., less than about 2 µm) than the $d_{50}$ particle diameter of the dry pulverized powder kaolin, since Sedigraph measures the individual, dispersed particles rather than the more coarse aggregates of the dry pulverized kaolin clay.

In some aspects of the present disclosure, the pulverized kaolin may have a shape that is platy or blocky. Kaolin particles of relatively high shape factor may be considered to be more "platy" than kaolin particles of low shape factor, which may be considered to be more "blocky." "Shape factor" as used herein is a measure of an average value (on a weight average basis) of the ratio of mean particle diameter to particle thickness for a population of particles of varying size and shape, as measured using the electrical conductivity method and apparatus described in patent publications GB 2,240,398, U.S. Pat. No. 5,128,606, EP 0 528 078, U.S. Pat. No. 5,576,617, and EP 631 665, and using the equations derived in these publications. For example, in the measurement method described in EP 0 528 078, the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and by using the difference between the two conductivity measurements, the shape factor of the particulate material under test is determined. A shape factor greater than 30 generally describes platy materials, whereas a shape factor less than 30 generally describes blocky materials. "Mean particle diameter" is defined as the diameter of a circle having the same area as the largest face of the particle.

In some examples, the pulverized kaolin may be platy, e.g., having a shape factor greater than 30, greater than 35, greater than 40, greater than 50, greater than 70, or even greater than 100. For example, the pulverized kaolin may have a shape factor ranging from 30 to 200, from 35 to 150, from 40 to 100, or from 50 to 70. In other examples, the pulverized kaolin may be blocky, e.g., having a shape factor equal to or less than 30, e.g., a shape factor ranging from 1 to 30, from 5 to 15, or from 3 to 10.

BET surface area refers to the technique for calculating specific surface area of physical absorption molecules according to Brunauer, Emmett, and Teller ("BET") theory. BET surface area may be measured by any appropriate measurement technique. As a non-limiting example, BET surface area can be measured with a Gemini III 2375 Surface Area Analyzer, using pure nitrogen as the sorbent gas, from Micromeritics Instrument Corporation (Norcross, Ga., USA).

According to some aspects of the present disclosure, the kaolin may have a BET surface area of at least 20 m$^2$/g, such as at least 25 m$^2$/g, at least 30 m$^2$/g, or at least 40 m$^2$/g. For example, the kaolin may have a BET surface area ranging from about 25 m$^2$/g to about 40 m$^2$/g, from about 30 m$^2$/g to about 40 m$^2$/g, or from about 35 m$^2$/g to about 40 m$^2$/g.

The fine particulate kaolin suitable for the compositions and methods herein may be prepared from coarse kaolin and/or crude kaolin clay (e.g., obtained directly from a kaolin clay deposit). The crude kaolin clay may comprise primary kaolin and/or sedimentary kaolin. Primary kaolin clays are those which are found in deposits at the site at which they were formed. For example, kaolin clays mainly of the primary type are obtained from deposits in South West England, France, Germany, Spain, and the Czech Republic. Sedimentary kaolin clays are those which were flushed out in geological times from the granite matrix in which they were formed, and were deposited in an area remote from their site of formation, generally in a basin formed in the surrounding strata. For example, kaolin clays obtained from deposits in the Southeastern United States and from Brazil are generally of the sedimentary type.

Pulverizing kaolin may facilitate its dispersal in the body of water to be treated, e.g., such that the kaolin is sufficiently distributed throughout the water. Thus, the pulverized kaolin may provide significant benefits in the efficacy of treatment as compared to crude kaolin, or even coarse kaolin provided by a limited amount of grinding. The compositions herein may, for example, remain dispersed or suspended in the water (such that the water is at least partially turbid) for at least 2 hours, at least 4 hours, at least 6 hours, at least 8 hours, at least 10 hours, or at least 12 hours or longer. For example, the pulverized kaolin may remain dispersed or suspended in the water for 2 hours to 24 hours, from 4 hours to 18 hours, from 6 hours to 12 hours, or from 4 hours to 16 hours. In contrast, crude kaolin or coarse kaolin may be unevenly distributed in the water and/or may settle out of the water, which may be insufficient for reducing or prevent accumulation of pathogenic microorganisms and/or reducing the incidence of filial cannibalism. For example, crude kaolin may settle out of the water in less than 1 hour or less than 10 minutes. Similarly, coarse kaolin (e.g., wherein greater than 70% by weight of the particles have a $d_{500}$ diameter greater than 0.25 µm) may remain dispersed or suspended in the water for less than 2 hours, or less than 1 hour.

The method of preparing the pulverized kaolin may be dry, such that no wet processing is involved. Further for example, the method may not include any chemical processing steps, e.g., preparation of the pulverized kaolin may not include the treatment of a crude or coarse kaolin with chemical agents such as, e.g., surface treatment agents, dispersants, surfactants, or other chemical agents. According to some aspects of the present disclosure, crude kaolin or coarse kaolin may be subjected to one or more pre-processing steps before pulverizing. For example, the crude kaolin may be subjected to processing in a slicer, shredder, crusher, chipper, de-lumper, and/or dryer. In at least one example, the crude kaolin may be pre-processed in one or more of a slicer, shredder, crusher, chipper, grinder, or de-lumper, followed by drying. For example, the crude kaolin may be dried, e.g., oven dried at a temperature of about 100° C. In some aspects of the present disclosure, the crude kaolin or coarse kaolin may not be subjected to any pre-processing before pulverizing.

Pulverizing may be performed with any pulverizing equipment suitable for providing fine particulate kaolin as disclosed herein. In some examples, pulverizing may be performed with a mill such as, e.g., a hammer mill, ball mill, roller mill, impact mill, or air classified mill. According to some aspects of the present disclosure, the pulverized kaolin may have a moisture content of less than 3.0% by weight, such as less than 2.0% by weight, less than 1.5% by weight, or less than 1.0% weight. For example, the moisture content of the pulverized kaolin may range from about 0.1% by weight to about 1.5% by weight, from about 0.5% by weight to about 1.2% by weight, e.g., a moisture content of about 0.5% by weight, about 0.6% by weight, about 0.7% by weight, about 0.8% by weight, about 0.9% by weight, about 1.0% by weight, about 1.1% by weight, about 1.2% by weight, about 1.3% by weight, about 1.4% by weight, or about 1.5% by weight.

The fine particle size of the pulverized kaolin may allow for the kaolin to disperse and remain suspended when introduced into water. Thus, for example, the composition may comprise less than 0.1% by weight, less than 0.05% by weight, or less than 0.01% by weight of dispersant. In some examples, the composition may not comprise any dispersant. For example, according to some aspects of the present disclosure, the composition added to water for treatment may consist of or consist essentially of pulverized kaolin.

The compositions of pulverized kaolin may be used to treat still water (e.g., ponds, lakes, wetlands, tank, etc.) and/or running water (e.g., streams, creeks, rivers, etc.). For example, the water may comprise fresh water. Further, the compositions and methods herein may be used to treat a natural body of water and/or water contained in an artificial structure (e.g., a manmade lake). The water may contain one or more species of fish, crustaceans, and/or shellfish, as well as other aquatic organisms.

The composition of pulverized kaolin may be administered to the water to establish a kaolin concentration ranging from about 0.01 g/L to about 8.0 g/L, such as from about 0.1 g/L to about 7.0 g/L, from about 0.5 g/L to about 6.0 g/L, from about 1.0 g/L to about 5.0 g/L, from about 2.0 g/L to about 4.0 g g/L, or from about 0.5 g/L to about 3.0 g/L, from about 0.1 g/L to about 2.0 g/L, or from about 1.0 g/L to about 5.0 g/L. For example, the pulverized kaolin may be added to the water (e.g., water contained in a vat or tank, such as a portable vat or tank) as a dry powder, which may disperse in the water to a concentration ranging from about 0.1 g/L to about 8/0 g/L within a period of time ranging from about 5 minutes to about 3 hours, such as from about 10 minutes to about 1 hour, e.g., a time period of about 20 minutes, about 30 minutes, about 40 minutes, or about 1 hour.

The pulverized kaolin may be introduced into the water once, or multiple times to increase or maintain a desired concentration of kaolin suspended or otherwise disposed in the water. For example, the pulverized kaolin may be introduced into the water once per day, twice per day, three times per day, once per week, twice per week, once every two weeks (biweekly), once a month, or other schedule, e.g., based on the volume of water, the quality of water (e.g., the concentration and/or chemical composition of suspended solids), the type(s) of aquatic life present in the water, and/or the amount of aquatic life present in the water.

According to some aspects of the present disclosure, the pulverized kaolin may be added to water prior to an anticipated transport of fish or other aquatic organisms contained in the water from a first habitat to a second habitat. For example, prior to, during, or immediately after transferring fish to a new habitat, pulverized kaolin may be added to the new habitat into which the fish are transferred. Similarly, pulverized kaolin may be added to the water of the original habitat prior to (e.g., one, two, or three or more days prior to) the anticipated transfer of fish to the new habitat. In at least one example, pulverized kaolin may be added to a portable tank or vat into which fish are introduced during transfer of the fish between stationary bodies of water (e.g., a first stationary tank to a second stationary tank). Further, for example, pulverized kaolin may be added one or more times, including, e.g., periodically, to a body of water additionally and/or independently of an anticipated transfer of the aquatic organisms contained in the water.

Without intending to be bound by theory, it is believed that the kaolin particles may provide surfaces onto which pathogenic microorganisms and/or pathogenic organisms may adsorb. As the kaolin settles to the water bed over time, the kaolin may effectively remove the pathogens from the water and thereby reduce contact with aquatic organisms such as fish, crustaceans, and/or shellfish living in the water.

The compositions and methods herein may be used to treat water to reduce and/or prevent exposure of aquatic organisms to pathogenic microorganisms/organisms chosen from bacteria (including, e.g., Gram-negative bacteria), protozoa, viruses, fungi, algae, and/or parasites. Exemplary pathogenic microorganisms include, but are not limited to, *Flavobacterium columnare, Edwardsiella lctaluri, Edwardsiella tarda, Saprolegnia, Aeromonas salmonicida, Aeromonas hydrophila, Aeromonas formicans, Aeromonas liquefaciens, Aeromonas hydrophila, Yersinia ruckeri, Renibacterium salmoninarum, Flavobacterium psychrophilum, Cytophaga, Flavobacterium branchiophila*, and *Vibrio harveyi*. In some examples, the water includes at least one Gram-negative bacterium. In at least one example, the pathogenic microorganism(s) present in the water comprise *Flavobacterium columnare*. In at least one example, the pathogenic microorganism (or pathogenic organism) may comprise algae.

The water to be treated may comprise one or more types of aquatic organisms, e.g., one or more fish, shellfish, and/or crustaceans. According to some aspects of the present disclosure, the aquatic organism(s) comprise at least one fish, such as, for example, a fish selected from catfish, tilapia, carp, salmon, sea bass, eels, mullet, bream, amberjack, grouper, perch, trout, sturgeon, or turbot, among others. In some examples, the fish may comprise ornamental fish, such as goldfish, koi, betas, and/or guppies. For example, the fish may be contained in a koi pond, aquarium, or aquatic water garden. Additionally or alternatively, the aquatic organism(s) may comprise at least one crustacean, such as, for example, a crustacean selected from shrimp, prawns, lobster, crabs, or crayfish. Further, additionally or alternatively, the aquatic organism(s) may comprise at least one shellfish, such as, for example, an oyster, a scallop, a mussel, or a clam.

According to some aspects of the present disclosure, the composition may be introduced into the water in an amount sufficient to increase the turbidity of the water for a period of time ranging from 2 hours to 24 hours or more. Increasing the turbidity of the water by introducing composition of pulverized kaolin as disclosed herein may improve the survival rate of juvenile fish, e.g., fry and fingerlings. Without intending to be bound by theory, it is believed that increasing the turbidity of the water may limit the ability for adult fish to locate and eat juvenile fish, e.g., including filial cannibalism. For example, according to some aspects of the present disclosure, the kaolin may increase the survival rate of juvenile fish.

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, unless otherwise indicated the numerical values set forth in the specific examples are reported as precisely as possible. Any numerical value, however, inherently contains certain errors necessarily resulting from the standard deviation found in their respective testing measurements.

By way of non-limiting illustration, examples of certain embodiments of the present disclosure are given below.

EXAMPLES

The following examples assessed the effectiveness of six different kaolin clays when used to treat water for $F.$ $columnare$ bacteria. The particle size and shape factor characteristics of the six kaolins tested are summarized in TABLE 1 below. The particle size information provides the percentage by weight of the particles having less than the specified diameter (ESD).

TABLE 1

| Sample # | <2 μm | <0.5 μm | <0.25 μm | Shape factor |
|---|---|---|---|---|
| Kaolin 1 | 60.5% | 27.0% | 12.9% | 4.6 |
| Kaolin 2 | 90.3% | 76.5% | 50.1% | 8.4 |
| Kaolin 3 | 55.5% | 30.5% | 14.7% | 23.2 |
| Kaolin 4 | 85.8% | 66.7% | 45.5% | 27.4 |
| Kaolin 5 | 62.4% | 32.1% | 13.8% | 8.2 |
| Kaolin 6 | 48.6% | 16.9% | 5.5% | 7.4 |

Twenty fingerling channel catfish (weighing approximately 5 g each on average) were stocked into an 18-L tank containing 10 L of filtered water. Water was provided through an Ultra-Low-Flow water delivery system at a rate of 29.1 mL/min. Fish were not fed the first day after challenge, but offered pelleted catfish feed (35% protein, 2.5% fat; Delta Western) on day 2 and throughout the rest of the study.

Fish were experimentally challenged with the virulent $F.$ $columnare$ isolate LSU-066. The isolate was retrieved from a glycerol stock preserved at 80° C. and streaked on Ordal's medium (Anacker & Ordal 1959). After 48 h, the isolate was dislodged from the agar using a sterile cotton swab and inoculated into 5 mL of $F.$ $columnare$ growth medium (FCGM; Farmer 2004). This suspension was incubated at 28° C. for 24 h and was used to inoculate 1 L of FCGM. The inoculated 1 L of broth was incubated for 24 h at 28° C. in an orbital shaker incubator set at 200 rpm; when the bacterial growth reached an absorbance of 0.75 at 550 nm, the flask was removed and placed on a stir plate at room temperature. Fish were challenged by adding 5 ml of the bacterial stock to each 10-L tank, with the exposed dose calculated to be $6.2 \times 10^6$ CFU/mL Fish were observed twice daily to assess mortality.

In the exemplary kaolin treatments, 1 g/L kaolin was slowly added to the water near the airstone to facilitate mixing within the tank. In kaolin-treated tanks, kaolin was added to water 5 min prior to challenge with $F.$ $columnare$ to allow sufficient mixing time and the ultra-low flow was initiated. The concentration of kaolin was selected based on previous reports demonstrating that this dose was well tolerated in rainbow trout. The duration of the challenge experiment was 7 days.

In another test done in vitro the kaolin sample was added to water containing around 9000 mio units per litre $F.$ $columnare$. After allowing sufficient mixing time, the kaolin was removed by centrifugation and the bacteria remaining in the supernatant were counted. The lower the bacteria count in the supernatant is, the more efficient bacteria were removed by the kaolin sample. As shown in FIG. 1, the relative observed $F.$ $columnare$ colony counts obtained after treating with each of the kaolins assessed varied greatly depending on the particle size of the kaolin. In particular, it was surprisingly observed that kaolins having a high content of very fine particles having a particle size less than 0.25 μm display a higher efficacy against $F.$ $columnare$.

Figure 2:
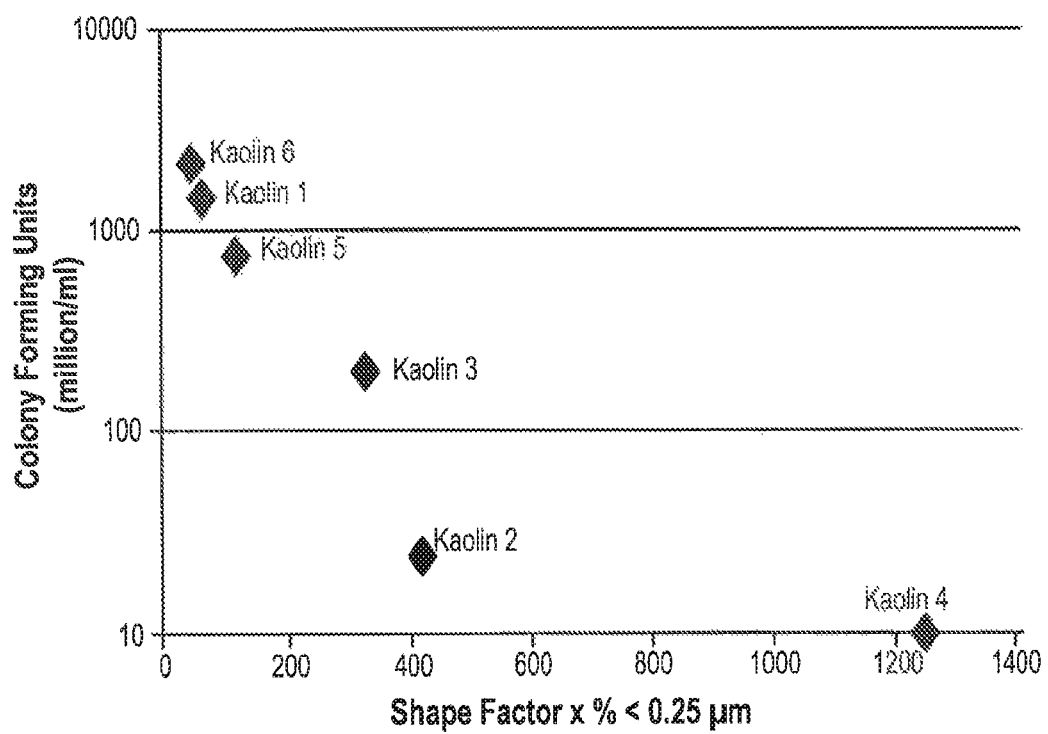
FIG. 2 is a graph representing the relative observed *F. columnare* colony counts obtained after treating with each of the kaolins assessed in the Examples, compared with the product of shape factor times % fine kaolin particles having a particle size less than 0.25 µm as measured by Sedigraph for each kaolin.

As illustrated in FIG. 2, there was an even greater dependence of observed $F.$ $columnare$ colony counts when shape factor was also considered in addition to fine particle content by multiplying the shape factor of the kaolin by its fine particle content (<0.25 μm content). Efficacy against $F.$ $columnare$ was suppressed to a surprisingly large degree when the water was treated with a very fine and platy kaolin clay, as shown by the very low colony count after treatment with kaolin 4.

Figure 3:
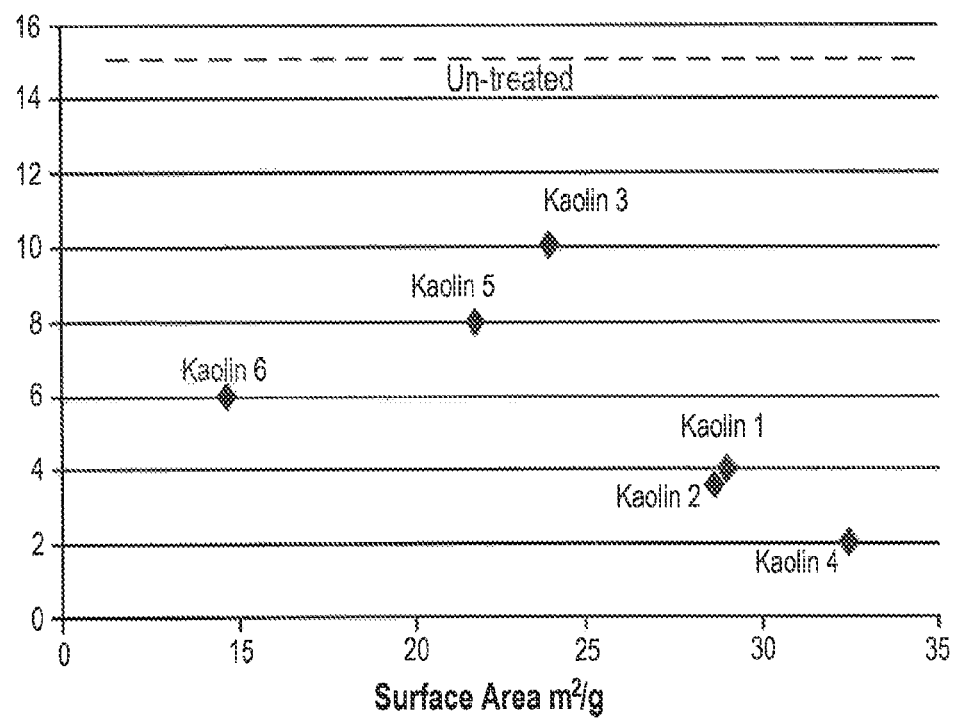
FIG. 3 is a graph representing the relative observed fish mortality after exposure to *F. columnare* after treating with each of the kaolins assessed in the examples, compared with the BET surface area for each kaolin.

As shown in FIG. 3, the efficacy against $F.$ $columnare$ in colony count experiments was also found to correlate to a decrease in fish mortality when fine kaolin clays were used. FIG. 3. illustrates the relative observed fish mortality after exposure to $F.$ $columnare$ after treating with each of the kaolins, compared with the BET surface area for each kaolin. BET surface area is inversely correlated to the kaolin particle size, so the higher BET surface area kaolins correspond to the same fine particle samples displaying efficacy in the colony count experiments.

Figure 4:
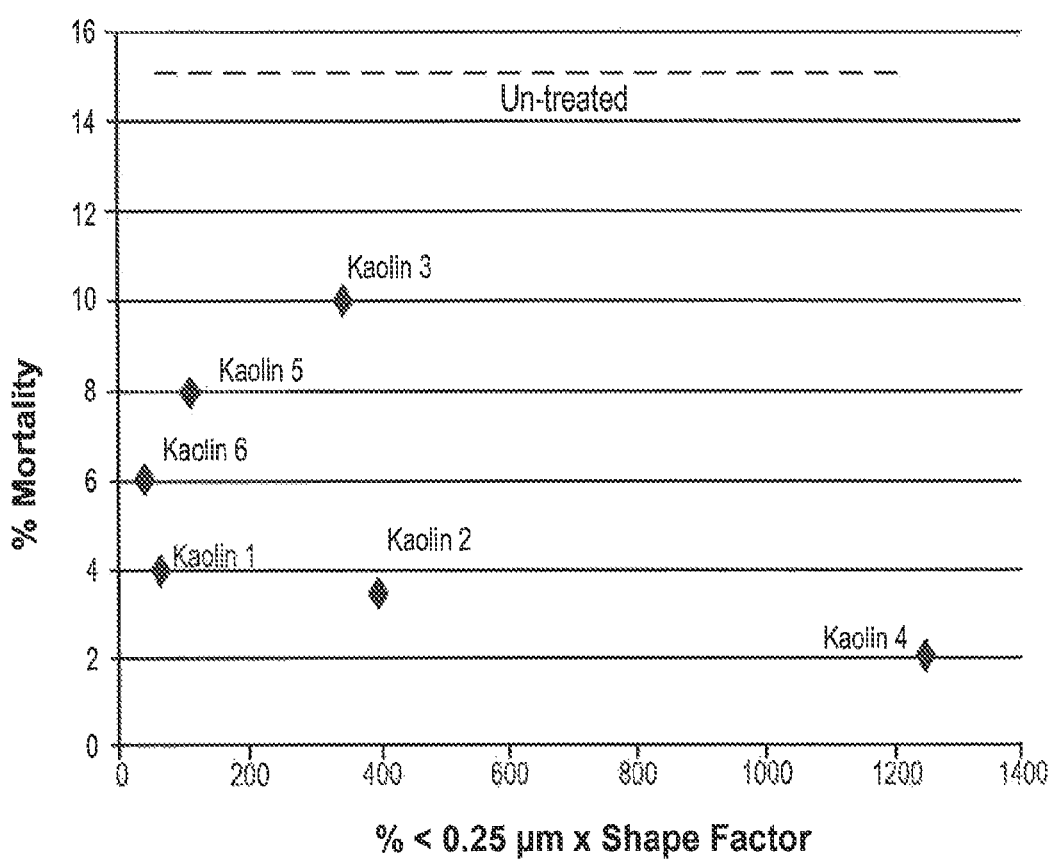
FIG. 4 is a graph representing the relative observed fish mortality after exposure to *F. columnare* after treating with each of the kaolins assessed in the Examples, compared with the product of shape factor times % fine kaolin particles having a particle size less than 0.25 µm as measured by Sedigraph for each kaolin.
Figure 5:
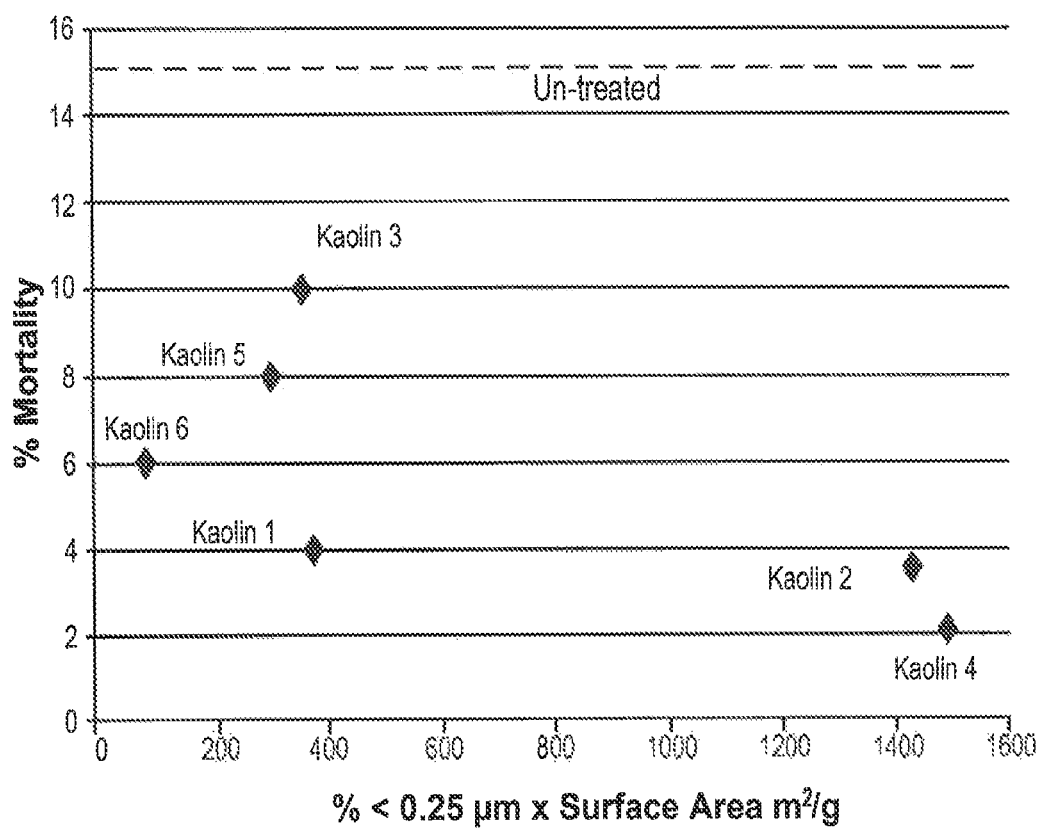
FIG. 5 is a graph representing the relative observed fish mortality after exposure to *F. columnare* after treating with each of the kaolins assessed in the Examples, compared with the product of specific surface area times % fine kaolin particles having a particle size less than 0.25 µm as measured by Sedigraph for each kaolin.

As shown in FIG. 4, the efficacy against $F.$ $columnare$ in the fish mortality experiment was also found to correlate to a decrease in fish mortality when fine and platy clays were used. FIG. 4. illustrates the relative observed fish mortality after exposure to $F.$ $columnare$ after treating with each of the kaolins compared with the product of shape factor and % fine particles for each kaolin. FIG. 5 illustrates the relative observed fish mortality after exposure to $F.$ $columnare$ after treating with each of the kaolins compared with the product of specific surface area and % fine particles for each kaolin.

Other aspects and embodiments of the present disclosure will be apparent to those skilled in the art from consideration of the specification and practice of the embodiments disclosed herein.

It is intended that the specification and examples be considered as exemplary only, with a true scope and spirit of the present disclosure being indicated by the following claims.

What is claimed is:

1. A method of treating water, the method comprising:
   introducing pulverized kaolin into the water, wherein the pulverized kaolin has a particle size distribution such that at least 30% by weight of the particles pass through a 60 mesh screen, and wherein the pulverized kaolin reduces the amount of at least one pathogenic microorganism present in the water.

2. The method of claim 1, wherein the pulverized kaolin remains suspended in the water for at least 2 hours.

3. The method of claim 1, wherein the pulverized kaolin disperses in the water to a concentration ranging from about 0.01 g/L to about 8.0 g/L.

4. The method of claim 1, wherein the at least one pathogenic microorganism comprises a bacterium, a protozoan, a virus, a fungus, a parasite, or a combination thereof.

5. The method of claim 1, wherein the at least one pathogenic microorganism is chosen from *Flavobacterium columnare, Edwardsiella lctaluri, Edwardsiella tarda, Saprolegnia*, or a combination thereof.

6. The method of claim 1, wherein the pulverized kaolin comprises less than 0.05% by weight of dispersant.

7. The method of claim 1, wherein the pulverized kaolin is in the form of dry powder and does not comprise a dispersant or surfactant.

8. The method of claim 1, wherein the water contains at least one aquatic organism chosen from fish, shellfish, crustaceans, or a combination thereof, and wherein the method reduces exposure of the at least one aquatic organism to the at least one pathogenic microorganism.

9. The method of claim 1, wherein the pulverized kaolin is in the form of a dry powder having a $d_{50}$ diameter less than 300 μm.

10. A method of treating water, the method comprising:
- introducing pulverized kaolin into the water, wherein the pulverized kaolin disperses in the water to a concentration ranging from about 0.01 g/L to about 8.0 g/L within 1 hour;
- wherein the water comprises fresh water contained in a portable tank; and
- wherein the pulverized kaolin reduces the amount of at least one pathogenic microorganism present in the fresh water.

11. The method of claim 10, wherein the pulverized kaolin is added to the water at least 6 hours before transporting the portable tank from a first location to a second location.

12. The method of claim 10, wherein the water contains at least one fish chosen from catfish, tilapia, carp, salmon, sea bass, eels, mullet, bream, amberjack, grouper, perch, trout, sturgeon, turbot, goldfish, koi, beta, guppy, or a combination thereof.

13. The method of claim 10, wherein the at least one pathogenic microorganism comprises a bacterium, a protozoan, or a combination thereof.

14. The method of claim 13, wherein the at least one pathogenic microorganism is chosen from *Flavobacterium columnare, Edwardsiella lctaluri, Edwardsiella tarda, Saprolegnia*, or a combination thereof.

15. The method of claim 10, wherein the pulverized kaolin has a particle size distribution such that from about 85% to about 93% by weight of the kaolin particles are retained on a 200 mesh screen, and from about 90% to 100% by weight of the particles are retained on a 325 mesh screen.

16. The method of claim 10, wherein the pulverized kaolin is in the form of a dry powder having a $d_{50}$ diameter ranging from about 50 μm to about 350 μm.

17. A method of treating water used in aquaculture, the method comprising:
- introducing pulverized kaolin into the water, wherein the pulverized kaolin has a particle size distribution wherein at least 40% by weight of the particles pass through a 60 mesh screen;
- wherein the pulverized kaolin disperses in the water to a concentration ranging from about 0.01 g/L to about 8.0 g/L; and
- wherein the pulverized kaolin reduces the amount of at least one pathogenic microorganism chosen from a bacterium or protozoan present in the water to reduce exposure of fish contained in the water to the at least one pathogenic microorganism.

18. The method of claim 17, wherein the at least one pathogenic microorganism comprises *Saprolegnia*.

19. The method of claim 17, wherein the water contains at least one juvenile fish chosen from catfish, tilapia, carp, salmon, sea bass, eels, mullet, bream, amberjack, grouper, perch, trout, sturgeon, or turbot, and wherein the method increases the survival rate of the at least one juvenile fish.

20. The method of claim 17, wherein the water is contained in a portable tank, and wherein the pulverized kaolin is added to the water at least 12 hours before transporting the portable tank from a first location to a second location.

* * * * *